United States Patent
Brice (10) Patent No.: US 10,829,857 B2
(45) Date of Patent: Nov. 10, 2020

(54) GAS PHASE ALLOYING FOR WIRE FED JOINING AND DEPOSITION PROCESSES

(71) Applicant: U.S.A. as represented by the Administrator of the National Aeronautics and Space Administration, Washington, DC (US)

(72) Inventor: Craig A. Brice, Yorktown, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 258 days.

(21) Appl. No.: 14/206,231

(22) Filed: Mar. 12, 2014

(65) Prior Publication Data
US 2014/0263246 A1    Sep. 18, 2014

Related U.S. Application Data

(60) Provisional application No. 61/777,556, filed on Mar. 12, 2013.

(51) Int. Cl.
| | |
|---|---|
| C23C 28/00 | (2006.01) |
| B23K 15/00 | (2006.01) |
| B23K 15/06 | (2006.01) |
| C22C 38/00 | (2006.01) |
| C22C 14/00 | (2006.01) |
| B23K 103/14 | (2006.01) |

(52) U.S. Cl.
CPC .......... *C23C 28/30* (2013.01); *B23K 15/0006* (2013.01); *B23K 15/0086* (2013.01); *B23K 15/0093* (2013.01); *B23K 15/06* (2013.01); *C22C 14/00* (2013.01); *C22C 38/00* (2013.01); *B23K 2103/14* (2018.08)

(58) Field of Classification Search
CPC ............. B23K 15/06; B23K 15/0086; B23K 15/0006; B23K 15/0093; B23K 2203/14; C22C 14/00; C22C 38/00; C23C 28/30
USPC ..................................................... 219/137 R
See application file for complete search history.

(56) References Cited

U.S. PATENT DOCUMENTS

| | | | | |
|---|---|---|---|---|
| 2,963,570 A | * | 12/1960 | Rieppel | B23K 9/173 219/137 R |
| 4,505,764 A | * | 3/1985 | Smickley | C21D 1/00 148/421 |
| 4,849,913 A | * | 7/1989 | Ward | G05B 19/4097 156/264 |
| 6,180,049 B1 | * | 1/2001 | Jang | B29C 67/0092 118/694 |

(Continued)

Primary Examiner — Tu B Hoang
Assistant Examiner — Erin E McGrath
(74) *Attorney, Agent, or Firm* — Jennifer L. Riley; Robin W. Edwards; Helen M. Galus (57) ABSTRACT

Gas is introduced into molten metal during an additive metal fabrication process and/or during a metal fusion process. The gas may comprise a process gas that flows through a tubular feed wire. The amount of process gas introduced can be controlled to vary the composition and/or material properties of metal deposits formed from a molten metal. Material properties such as yield strength, hardness, and fracture toughness can be increased or decreased in specific regions to provide material property gradients that closely correspond to expected requirements of components fabricated utilizing additive and/or fusion processes.

18 Claims, 5 Drawing Sheets

(56) References Cited

U.S. PATENT DOCUMENTS

| | | | |
|---|---|---|---|
| 6,568,077 B1 * | 5/2003 | Hellemann | B23K 9/044 228/19 |
| 7,168,935 B1 | 1/2007 | Taminger et al. | |
| 8,344,281 B2 | 1/2013 | Taminger et al. | |
| 8,452,073 B2 | 5/2013 | Taminger et al. | |
| 2007/0012138 A1 * | 1/2007 | Brice | C23C 8/28 75/10.13 |
| 2008/0011391 A1 * | 1/2008 | Brenner | B23K 26/34 148/421 |
| 2010/0291401 A1 * | 11/2010 | Medina | B23K 15/0086 428/593 |
| 2011/0240607 A1 * | 10/2011 | Stecker | B23K 15/0086 219/121.17 |

* cited by examiner

GAS PHASE ALLOYING FOR WIRE FED JOINING AND DEPOSITION PROCESSES

CROSS-REFERENCE TO RELATED PATENT APPLICATION(S)

This patent application claims the benefit of and priority to U.S. Provisional Patent Application No. 61/777,556, filed on Mar. 12, 2013, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Metals and metal alloys have been widely used in fabricating a wide range of components. Metal components may be made by known processes such as casting, machining, roll forming, welding, and other such processes. Metal components may be made from metal having substantially uniform material properties. However, in use, the material of a component may be subject to uneven stress levels or other environmental factors. For example, brackets or other such structural components may be subjected to loading that creates high stress levels in specific regions such as openings utilized for mechanical fasteners. The material thickness may be increased in regions that are subject to higher stress levels to account for the higher stress. However, adding material in high stress areas may result in additional weight. Higher strength materials may also be utilized to meet the higher stress levels. However, in some situations, substitution of a higher strength material may not be feasible if the higher strength material has other properties that are incompatible with the design requirements for the component. For example, a higher strength metal alloy may have reduced fracture toughness which may be required in some areas of the part.

Various processes have been developed for fabricating objects. An example of an additive process is an electron beam freeform fabrication (hereinafter referred to as "EBF³") process as disclosed in U.S. Pat. Nos. 8,452,073 and 7,168,935. The EBF³ process may be combined with machining operations to provide a high tolerance surface finish. Also, components fabricated utilizing an EBF³ process may be welded to non-EBF³ components to form "hybrid" objects. The EBF³ process provides a way to fabricate metal components without utilizing traditional casting, rolling, or forging operations.

Fabrication of metal components may involve welding two or more metal components together utilizing molten metal. Fusion welding techniques may employ a localized molten pool and external filler material. However, these techniques may suffer from various metallurgical limitations. These limitations include coarse, cast-like microstructures, vaporization of volatile alloying elements, and other detrimental metallurgical effects. The outcome may therefore include reductions in one or more critical properties for welding and operations. A modified composition for the filler wire may be utilized in an effort to compensate for reduced properties due to the metallurgical effects of the process. However, this solution is generally limited to common alloys with widespread use in welded structures where modified wire is commercially available. For other materials, specialty wire with modified chemistry may be impractical due to the inability to draw the composition into wire form and/or the prohibitive expense in doing so.

During additive fabrication techniques such as the EBF³ process, and during welding processes, the molten material may be highly reactive with certain gaseous species. This is generally viewed as a potential source of contamination, and measures are usually employed to limit these reactions. For example, an EBF³ process may be performed in a vacuum. Welding operations may be performed in the presence of an inert gas such as argon.

Reactive gasses have been utilized in the modification of metal alloys. For example, stainless steels may be modified using nitrogen. This may be done inside a pressure vessel furnace where the molten metal is allowed to interact with a pressurized gas for a period of time. Hard face coating operations may be utilized to harden a material surface. For example, the introduction of nitrogen into titanium can produce a uniform dispersion of titanium nitride nanoparticles that greatly enhance the hardness of titanium and its wear resistance.

BRIEF SUMMARY OF THE INVENTION

One aspect of the present invention is a method of fabricating an object. The method includes providing data representing an object to be fabricated, and determining at least one material property to be controlled according to a predefined, non-uniform distribution during fabrication of the object. A molten pool of metal is formed, additional metal is melted and added, and the molten pool of metal is solidified to form a metal deposit. An additional molten pool of metal is formed on at least a portion of the metal deposits, and the additional molten pool of metal is solidified to form an additional metal deposit. Molten pools of metal are added and solidified utilizing the data representing an object to thereby form an object corresponding to the object represented by the data. The composition of at least a portion of the molten pools of metal and/or the grain structure of at least a portion of the metal deposits is controlled to provide a predefined non-uniform distribution of the material property in the object that closely matches the predefined material property distribution.

In some embodiments, the method includes providing data representing a two- or three-dimensional object to be fabricated, and determining at least one material property to be controlled according to a predefined, non-uniform distribution during fabrication of the object. A molten pool of metal is formed, additional metal is melted and added, and the molten pool of metal is solidified to form a metal deposit. An additional molten pool of metal is formed on at least a portion of the metal deposits, and the additional molten pool of metal is solidified to form an additional metal deposit. Molten pools of metal are added and solidified utilizing the data representing a two- or three-dimensional object to thereby form a two- or three-dimensional object corresponding to the two- or three-dimensional object represented by the data. The composition of at least a portion of the molten pools of metal and/or the grain structure of at least a portion of the metal deposits is controlled to provide a predefined non-uniform distribution of the material property in the two- or three-dimensional object that closely matches the predefined material property distribution.

At least a portion of the molten pools may be formed by melting at least one hollow wire, and the composition and/or grain structure may be controlled by introducing a process gas into at least a portion of at least one molten pool through the hollow wire. More than one hollow wire may be used with any number of hollow wires up to about 12 wires being used in a given EBF³ process. In addition, a combination of hollow and solid wires may also be used in a given EBF³ process and any numerical combination of hollow and solid wires up to about 12 wires may be used. Further, with respect to the hollow wires, the same or different process gasses may be introduced into each hollow wire. The gas may comprise a reactive gas that alters the properties of metal forming the molten pools. The molten pools may comprise titanium, and the reactive gas may comprise nitrogen that forms titanium nitride particles to provide non-uniform hardness distribution. Alternatively, the molten pools may comprise titanium, and the gas may comprise oxygen. The oxygen concentration in the titanium material may be controlled during the formation of the molten pools to form at least a region of the object having different material strength relative to any other region of the object. In one embodiment, the different material strength of a region being five percent higher than the material strength of another region. In another embodiment, the material strength of a region being five percent lower than the material strength of another region. The object may comprise an aircraft structural component, and the material properties that are controlled may include yield strength, hardness, and fracture toughness. The concentration of oxygen in the molten pools of metal may be controlled to provide a distribution of yield strength and fracture toughness properties in the aircraft structural component according to predefined requirements.

The molten pools may be formed utilizing an electron beam in a vacuum utilizing an EBF³ process. Alternatively, the molten pools may be formed during a welding process forming molten pools that solidify to join metal workpieces. The material properties of the weld joint may be controlled by controlling flow of reactive gas through a hollow wire feed stock.

These and other features, advantages, and objects of the present invention will be further understood and appreciated by those skilled in the art by reference to the following specification, claims, and appended drawings.

DETAILED DESCRIPTION OF THE INVENTION

Figure 1:
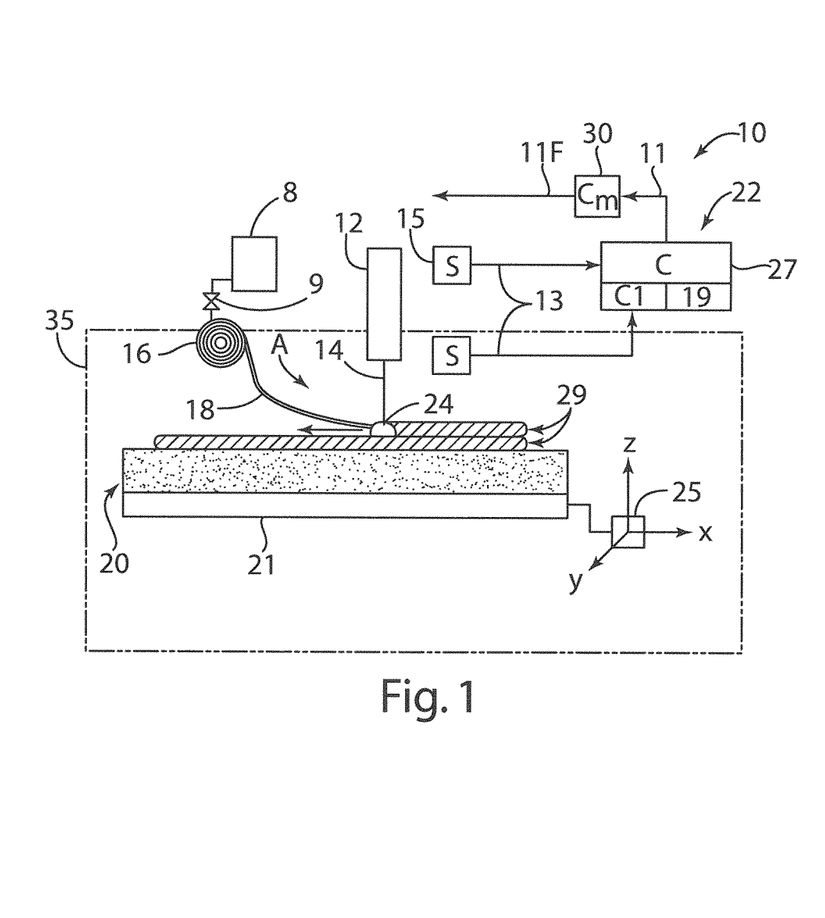
FIG. 1 is a partially schematic view of an apparatus utilized to form metal components utilizing an EBF³ process.
Figure 2:
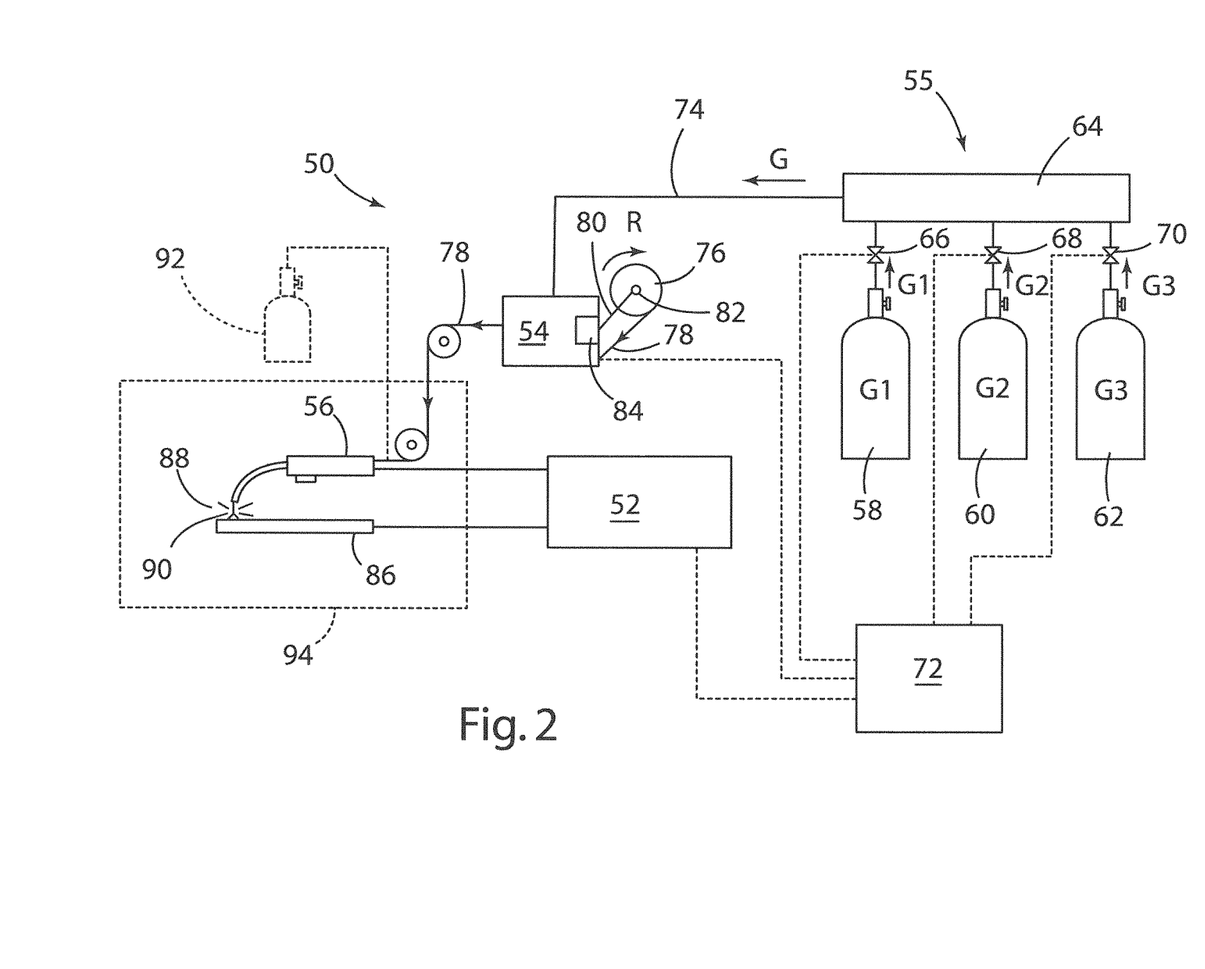
FIG. 2 is a schematic view of a welding apparatus according to one aspect of the present invention.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention involves controlling the composition of metal or other material as an object is being fabricated to thereby control and/or vary the alloy composition throughout the object to provide specific material properties as required at different areas of the object. For example, a structural component made from titanium may have local areas with high stress concentrations at fastener locations or the like. However, other regions of the same structural component may have lower stress in use, but these other areas may require higher fracture toughness. An example of the present invention involves increasing the oxygen concentration in a titanium alloy during fabrication at high stress areas, and providing lower oxygen concentration in areas of the component requiring higher fracture toughness. As discussed in more detail below, the present invention may utilize various metals and various gasses to provide specific material properties as required at different areas of an object.

The present application may be utilized in connection with an additive process such as an electron beam freeform fabrication process, hereinafter abbreviated as "EBF³" for simplicity. The present invention may also be utilized in connection with other types of additive processes that utilize wire as a feedstock. An EBF³ process is described in connection with FIG. 1. The present invention may also utilize a joining operation such as a welding process as described in more detail below in connection with FIG. 2.

An apparatus 10 (FIG. 1) of the type described in more detail in U.S. Pat. Nos. 8,452,073, and 7,168,935 the contents of each being incorporated herein by reference, is configured for use in an EBF³ process. An example of an EBF³ process to which the present invention could be applied is also described and claimed in U.S. Pat. No. 7,168,935. As will be understood by those of ordinary skill in the art, an EBF³ process allows an object to be formed in a progressive or layered manner using an electron beam 14. One advantage of the EBF³ process is that the process is able to accurately form complex objects. Exemplary objects that can be formed using the EBF³ process include any physical or tangible thing, such as for example, a part, a component (including terrestrial vehicle, aircraft, marine, and spacecraft components), a piece, a portion, a segment, a section, a fragment, a tool, a die, a sheet, a film, a patch, a layer, and/or a design, and so on. The apparatus 10 is used with an EBF³ process, and includes an electron beam gun 12 contained in a sealed container or vacuum chamber 35 capable of maintaining a controlled atmosphere. The controlled atmosphere preferably comprises a vacuum. However, as discussed below, gas may be introduced into a molten pool 24 utilizing tubular wire 18 and a gas supply. Thus, some gas may be present in chamber 35. The gun 12, part of which may be positioned outside of the chamber 35 for access and electrical connectivity, is adapted to generate and transmit an electron beam 14 within the controlled atmosphere, and to direct the beam toward a substrate 20. In the embodiment of FIG. 1, the substrate 20 is positioned on a moveable platform 21. Alternately, the gun 12 may be completely enclosed within chamber 35 so that the gun is also moved rather than just the substrate 20. In either embodiment, the gun 12 moves relative to the substrate 20. It will be understood that the processes herein may, when discussing relative movement, simply refer to the movement of the gun in the written description and/or claims. This movement, unless expressly stated otherwise, may actually comprise movement of both the gun and the substrate 20, or movement of only the gun or the substrate.

The platform 21 and/or the gun 12 may be movable via a multi-axis positioning drive system 25, which is shown schematically as a box in FIG. 1 for simplicity. In some embodiments a complex or three-dimensional ("3D") object is formed by progressively forming and cooling a metal deposit in the form of a molten pool 24 into layers 29 on the substrate 20. Metal deposit 24 is initially in the form of a molten pool that is formed by electron beam-melting of consumable wire 18, e.g., a suitable metal such as aluminum or titanium, which is fed toward the molten pool 24 from a wire feeder 16. In some embodiments, the electron beam 14 forms a molten pool 24 on the substrate 20 into which the metal wire 18 is added. The electron beam 14 interacts with the wire 18 so that the wire is partially molten as it enters the molten pool 24. The beam 14 and the wire 18 simultaneously meet at the substrate 20 and form a molten pool 24 of material and as the motion control system translates, a bead of deposited material is formed.

The term "metal deposit" is used herein if the metal is in a solid state, and the term "molten pool" is used herein if the metal is in a liquid state. The wire feeder 16 may comprise a spool or other suitable delivery mechanism having a controllable wire feed rate or speed. While not shown in FIG. 1 for simplicity, chamber 35 may be evacuated using a vacuum subsystem such as a turbo-molecular pump, a scroll pump, an ion pump, ducts, valves, etc., as understood in the art.

The apparatus 10 may include a closed-loop controller (C) 22 having a host machine 27 and an algorithm(s) C1 adapted for controlling an EBF$^3$ process conducted using the apparatus. Controller 22 is electrically connected to or in communication with a main process controller (Cm) 30 which, as understood in the art, is adapted for sending necessary commands to the gun 12, the wire feeder 16, and any required motors (not shown) that position the substrate 20 and the gun 12. The commands include a set of final control parameters 11F. The controller 22 generates and transmits a set of input parameters 11 that modifies the final control parameters 11F. It will be understood that a closed-loop control can be used but is not required for the present invention.

The wire 18, when melted by the electron beam 14, e.g., to over approximately 3000° F. in one embodiment, is accurately and progressively deposited, layer upon layer, according to a set of design data 19, e.g., Computer Aided Design (CAD) data or another 3D design file. The temperatures utilized to melt the wire 18 depend on the composition of the wire 18. For example, temperatures of around 3000° F. may be utilized for titanium and steel. However, much lower temperatures are typically utilized for metals such as aluminum and other alloys having low melting temperatures. In this manner, a 3D structural part or other complex object may be created in an additive manner without the need for a casting die or mold.

In order to achieve closed-loop EBF$^3$ process control, the closed-loop controller 22 of FIG. 1 may be electrically connected to one or more sensors (S) 15 to detect or measure one or more specific features of interest of the molten pool 24, with the information describing the feature of interest relayed to the controller 22 as a set of sensor data 13. Host machine 27 receives the sensor data 13 and runs one or more algorithms, represented collectively as the algorithm C1 in FIGS. 1 and 2, to interpret the sensor data. The controller 22 signals the main process controller 30 to modify the final control parameters 11F for the EBF$^3$ process as needed. For example, the controller 22 may signal the main controller 30 to alter a feed rate of the wire feeder 16, a power value of the gun 12, a speed of the moveable platform 21, and/or any other components of the apparatus 10. It will be understood that the present invention can use but does not require closed loop control.

Host machine 27 may comprise a desktop computer equipped with a basic data acquisition and analysis software environment, e.g., Lab View® software, and high speed data acquisition boards for real-time acquisition and analysis of large volumes of data associated with high speed data images. The host machine 27 may include sufficient read only memory (ROM), random access memory (RAM), electrically-erasable programmable read only memory (EEPROM), etc., of a size and speed sufficient for executing the algorithm C1 as set forth below. The host machine 27 can also be configured or equipped with other required computer hardware, such as a high speed clock, analog-to-digital (A/D) and digital-to-analog (D/A) circuitry, input/output circuitry and devices (I/O), as well as appropriate signal conditioning and/or buffer circuitry. Any algorithms resident in the host machine 27 or accessible thereby, including the algorithm C1, can be stored in memory and automatically executed to provide the respective functionality.

Algorithm C1 is executed by the host machine 27 to interpret the sensor data 13, and to assess the magnitude and speed of any changes occurring during the EBF$^3$ process. As discussed in more detail in the Taminger '073 patent, a closed feedback loop is formed between the controller 22, working with the main process controller 30 and the controlled EBF$^3$ system components, e.g., the electron gun 12, wire feeder 16, etc., to allow for a real-time modification to the final control parameters 11F.

The features of interest to be monitored during the EBF$^3$ process are measured and/or determined by the sensors 15. Sensors 15 may comprise a charge-coupled device (CCD)-equipped camera adapted to convert an image of the process region (arrow A) into a digital signal suitable for processing by the host machine 27. Sensors 15 may also include a Complementary Metal-Oxide Semiconductor (CMOS)-based camera used to visually monitor the EBF$^3$ process with relatively low noise/low power consumption. Sensors 15 may use a CCD-equipped camera in conjunction with an infrared (IR) band-pass filter(s) to thermally image the EBF$^3$ process. A secondary electron detector may also be used as or with one of the sensors 15 to further visually monitor the EBF$^3$ process.

As shown in FIG. 1, at least one of the sensors 15 may be mounted outside of the vacuum chamber 35, e.g., when a fixed-gun system is used. As will be understood by those of ordinary skill in the art, in a fixed-gun system all motion occurs on the deposited part such that the deposition process always occurs in the same spot, thereby enabling installation of a sensor 15 in the form of a fixed camera at a position outside of the vacuum chamber 35. A sensor 15 configured and positioned as described may be used to monitor, for example, a height of any deposited material or bead of the molten pool 24, and/or a distance between the molten pool and the wire feeder 16.

Sensors 15 equipped as digital cameras having CCD capability may be installed in several different orientations inside the process chamber 35, with the digital cameras being focused on the process zone as indicated by arrow A. A CMOS-equipped camera may be installed outside of the vacuum chamber of gun 12, and a fiber optic cable (not shown) or other communications conduit may be used to transmit images from within the vacuum chamber to the CMOS camera. These cameras may be used to image bead shape and height during formation of the molten pool 24, a location of the wire 18 relative to the molten pool, and melt pool shape and area as determined by examining the change in reflectance between the molten and solid material.

IR band-pass filters may also be installed on sensors 15 configured as CCD-equipped or CMOS-equipped digital cameras in order to examine a temperature of the molten pool 24 and the surrounding region. A secondary electron detector as noted above may be installed and adapted to use electrons from the electron beam 14 to image the EBF$^3$ process in real-time. Electrons reflected off wire 18 and the molten pool 24 may be pulled into a sensor 15 adapted as such a secondary electron detector to provide an image of anything that the incident electron beam encounters. A raster pattern of the electron beam 14 can be automatically modified to expand the imaging field. It will be understood that various imaging devices may be utilized, and the present invention is therefore not limited to specific imaging devices, CCD and CMOS.

It will be understood that the present invention is not limited to the specific EBF$^3$ apparatus and process described above.

As discussed in more detail below, an EBF$^3$ process may be utilized to form objects having predefined non-uniform distributions of material properties as required for a particular application.

Also, tubular wire may also be utilized in laser-based additive systems to supply gas into a molten pool of metal to control the material properties. For example, in FIG. 1, the gun 12 may comprise a laser of a laser welding system that is utilized to melt tubular wire 18 to form layers of metal deposits. Because laser-based systems can be operated in open air, a laser based system does not need to include a vacuum chamber 35.

With further reference to FIG. 2, a welding apparatus 50 may also be utilized in joining operations according to another aspect of the present invention. As discussed in more detail below, the welding apparatus 50 utilizes tubular wire 78 to introduce gas directly into a molten pool of metal 90 to thereby control the material properties of a weld joint to form weld joints with specific predefined properties. Each weld joint may have unique material properties as required for a particular object or objects. The welding apparatus 50 includes a power supply 52, a wire feed control 54, a welding gun 56, and a gas supply 55. Power supply 52 is electrically connected to welding gun 56 and a workpiece 86 in a known manner. Gas supply 55 may comprise one or more gas tanks or reservoirs 58, 60, and 62 that are fluidly connected to a manifold 64. Flow of gas from the tanks 58, 60, and 62 is controlled by valves 66, 68, and 70. The valves 66, 68, and 70 are operably connected to a controller 72. The controller 72 is configured to selectively open and/or close the valves 66, 68, and 70 to thereby control flow of gas from the tanks 58, 60, and 62 into the manifold 64. The gas "G" from manifold 64 flows through a line 74 to wire feed control 54. The wire feed control 54 feeds tubular wire 78 from a spool or other suitable wire supply 76, and feeds the wire 78 to welding gun 56. The wire 78 may comprise tubular metal wire having a hollow core. The wire feed control 54 may include a gas line 80 that provides gas from manifold 64 to a first end 82 of a wire supply spool 76. The gas line 80 may include a rotating joint of a known type (not shown) that connects to first end 82 of wire 78 to thereby permit rotation of first end 82 of wire 78 relative to the gas line 80 as the spool 76 rotates. The wire feed control 54 may include an additional flow control valve 84. The wire feed control 54 is operably connected to controller 72 whereby the wire feed rate and gas flow rate into wire 78 can be precisely controlled.

As the wire is fed through welding gun 56, an arc 88 and molten pool of metal 90 are formed on a workpiece 86. The molten pool of metal 90 generally comprises melted metal of wire 78, and may include melted metal from workpiece 86.

The gas in tanks 58, 60, 62 comprise various gasses that are supplied through the tubular wire 78 directly into the molten pool of metal 90. The gasses may be reactive or non-reactive as required to achieve a specific material property in a weld joint. In FIG. 2, three gas tanks 58, 60, and 62 are shown for purposes of illustration. However, the welding apparatus 50 may include a single tank having reactive or non-reactive gas, or the system may include a relatively large number of tanks, wherein each tank includes a different reactive gas. For example, the tank 58 may include a reactive gas G1 comprising nitrogen, the tank 60 may contain a reactive gas G2 comprising oxygen, and the tank 62 may contain a reactive gas G3 comprising hydrogen. The tubular wire 78 and workpiece 86 may comprise various metals as required for a particular object to be fabricated. Thus, the reactive gasses G1, G2, G3, etc. may be selected to provide specific desired interactions or chemical changes in the specific type of metal forming wire 78 and workpiece 86 as required for a particular application.

The welding gun 56 may, optionally, be operably connected to a supply of inert gas 92 in a known manner. The inert gas 92 may be fed through the welding gun 56 to flood/cover the molten pool of metal 90 to prevent exposure of the molten pool 92 oxygen or other gasses in the air during the welding operation. The welding operation may, alternatively, be performed in a controlled environment comprising specific gasses or a vacuum. Chamber 94 may be utilized to form a vacuum or other specific controlled environment as may be required. The welding gun 56 may comprise a hand-held unit, or it may be mounted to a robot (not shown) of the type that is known in the art.

It will be understood that a gas that is reactive with respect to one metal may not be reactive with respect to other metals. Furthermore, in both additive and fusion processes, some gasses may be utilized to alter the material properties of a metal in ways that are not a result of a chemical reaction. For example, if a relatively large amount of gas is introduced into a molten pool of metal during an additive process (e.g. the EBF$^3$ process of FIG. 1) or a fusion (welding) process (FIG. 2), the gas may form voids that alter the density of the material in specific regions. Thus, the term "process gas" as used herein broadly refers to a gas that interacts with the molten pool of metal (i.e. molten metal) to change a material property of the resulting metal deposit that is formed when the molten metal is solidified. The "process gas" is capable of chemically reacting with altering, effecting, and/or modifying a material property of a metal, even if the "process" gas does not alter the chemical composition of the metal in the molten pools of metal 24 and 90.

Various types of objects and components may be fabricated utilizing an additive system such as the EBF³ system of FIG. 1 or the welding system of FIG. 2. An example of such a component is the object 96 of FIG. 3. The object 96 includes a tubular central portion 98, and flanges 100 and 102. The flanges 100 and 102 include a plurality of openings 104 that receive threaded fasteners. A computer aided stress analysis program or the like may be utilized to determine predicted high stress regions 106 that may occur around the openings 104. Additional high stress regions 108 may occur at the intersection of the flanges 100 and 102 with the tubular portion 98. The object 96 may be made from a metal such as titanium utilizing an EBF³ process. Specifically, the EBF³ apparatus utilized in this process includes a gas supply 8 that supplies a reactive gas to a tubular wire 18. A valve 9 is utilized to control the flow of the reactive gas into the tubular titanium wire 18. The gas supply 8 and valve 9 may be operably connected to the controller 22 to thereby control the flow rate of the reactive gas through the tubular titanium wire 18. The system 10 thereby provides for controlled introduction of reactive gas directly into the molten pool of metal 24. If the object 96 comprises titanium, the tubular wire 18 utilized to form the object 96 also comprises titanium. In this example, the gas supplied to the tubular wire 18 may comprise oxygen. In general, a low oxygen content in titanium provides higher fracture toughness, but also lowers static strength (yield strength). Thus, during the fabrication of object 96 utilizing the EBF³ apparatus of FIG. 1, additional oxygen can be supplied to the molten pool 24 in the high stress regions 106 and/or 108 to thereby increase the strength of the material in these areas. The gas supply 8 may include tanks (not shown) that supply specific gasses (e.g. nitrogen, oxygen, hydrogen, etc.) as may be required to provide specific material properties in object 96. Thus, additional gasses may also be utilized during the fabrication of object 96. For example, if the outer surfaces 110 and 112 of flanges 100 and 102, respectively, are subject to a high wear environment, nitrogen gas may be supplied to the hollow titanium wire 18 at the time the surfaces 110 and 112 are fabricated to thereby increase the hardness of the titanium in these regions. It will be understood that a mixture of process gasses may be supplied through the tubular wire 18 to provide specific material properties as may be required for a particular region of the object 96. The process gasses can be reactive gasses, inert gasses, and any combination of the foregoing.

Figure 3:
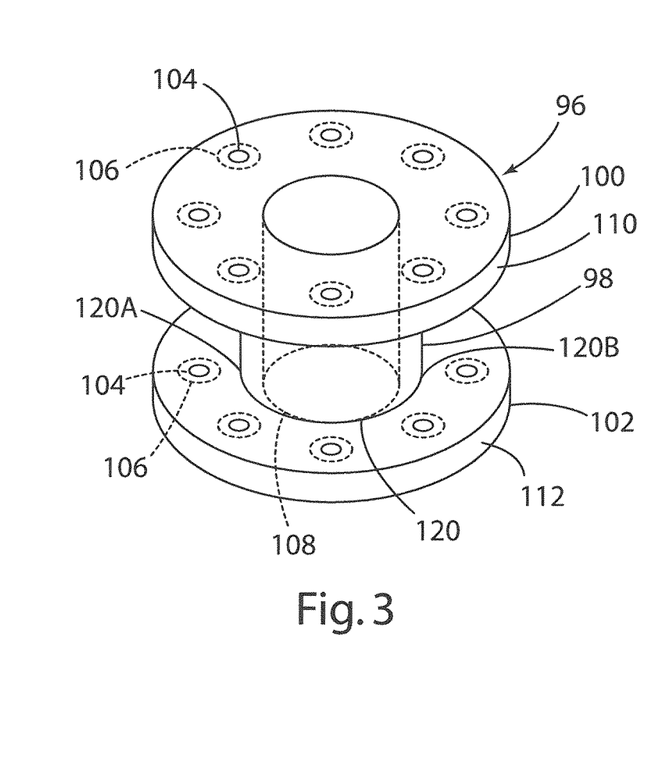
FIG. 3 is an isometric view of an object that may be fabricated according to the present invention.

In FIG. 3, the high stress regions 106 and 108 are shown in dashed lines. However, it will be understood that the high stress regions generally comprise a stress gradient such that the stress tapers or varies from a peak in certain regions to a reduced level in other regions. The amount of reactive gasses supplied through tubular titanium wire 18 may be varied during the EBF³ process to thereby control the composition and material properties of the metal deposits that form an object 96. For example, a relatively high flow rate of process gas (e.g. oxygen) may be supplied through the tubular wire 18 at the time the molten pools immediately adjacent the openings 104 are formed, and the flow rate of the oxygen through the tubular titanium wire 18 may be gradually reduced as the metal deposits further away from the openings 104 are formed. In this way, the properties (e.g. yield strength) of the titanium material of object 96 may form a gradient that closely matches the stress level gradients experienced by the object 96 in use. The regions of object 96 that are remote from the fastener openings 104 (e.g. tubular portion 98) may be fabricated utilizing little or no oxygen flow through tubular titanium wire 18. In this way, the titanium forming the low stress regions of object 96 will have higher fracture toughness with a reduced yield strength.

Figure 4:
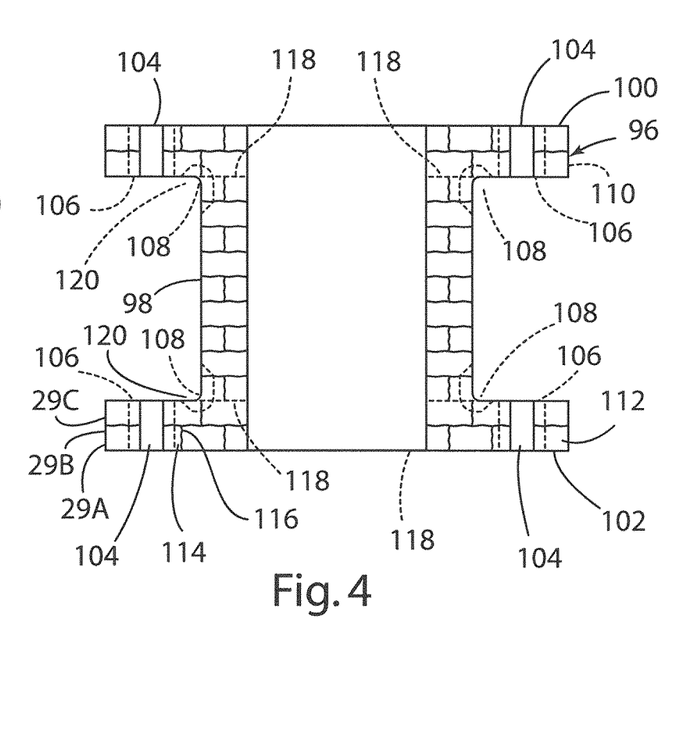
FIG. 4 is an isometric view of an object that may be fabricated according to the present invention.

With further reference to FIG. 4, the object 96 is generally fabricated by building up a plurality of layers 29A, 29B, 29C, etc. from molten pools 24 (FIG. 1). The layers 29A-29C, etc. may include a plurality of metal deposits or zones 114. The metal deposits 114 are formed when the molten pools 24 solidify. In FIG. 4, the metal deposits 114 are shown as having horizontal and vertical boundaries 116. Thus, in FIG. 4, the metal deposits 114 form a plurality of zones or regions defined by boundaries 116 between adjacent metal deposits 114. However, it will be understood that the metal forming the layers 29A, etc. and regions 114 may melt and flow together somewhat during the fabrication process, such that the boundaries 116 actually comprise zones or regions wherein the material composition and/or properties gradually vary to provide a transition between adjacent regions 114 having different material compositions and/or properties. The amount of energy supplied by the electron beam gun 14, the feed rate of wire 18, the flow rate of gas through the wire 18, and other variables may be controlled to increase or decrease the degree to which solidified metal deposits 114 adjacent molten pool 24 are melted to thereby control the extent to which the boundaries 116 comprise a sharp or abrupt transition in material composition and/or properties or a more gradial transition in material properties. If the amount of gas flowing into molten pool 24 is varied, the material properties of the deposits 114 may also therefore vary. The volume of reactive gas flowing through the tubular wire 18 can be precisely controlled, and the feed rate of the tubular wire 18 and the energy supplied by electron beam 14 can also be controlled to thereby control the size and shape of the molten pools 24 and the metal deposits 114 formed from the molten pools 24. In general, testing can be utilized to determine the effect of various process variables on the material composition and/or properties, and this data can be utilized in connection with measured variables during the EBF³ process to precisely control the material composition and/or properties during the EBF³ process. In this way, one or more material properties of the object 96 can be controlled to form gradients as required to meet one or more requirements of a particular application.

The example object 96 may also be fabricated utilizing the welding apparatus of FIG. 2. Referring again to FIG. 4, in this example, the tubular center portion 98 and flanges 100 and 102 comprise three separate pieces that are formed conventionally (i.e. not utilizing an EBF³ process) and are welded together at weld joints 120 utilizing the welding apparatus 50 of FIG. 2. The three components 98, 100, and 102 are initially positioned in contact with one another along the joint lines shown as dashed lines 118 in FIG. 4. Referring again to FIG. 3, in this example the object 96 may experience a relatively high stress load in the vicinity of a weld joint 120A, and low stress in the vicinity of a weld joint 120B. If the object 96 is made from titanium, the wire 78 (see FIG. 2) of welding apparatus 50 may comprise a titanium wire, and oxygen gas may be supplied to the tubular wire from gas supply 60. As discussed above, increased oxygen content in titanium alloys generally results in higher tensile strength. Accordingly, the weld joint 120A may be formed utilizing a relatively high flow rate of oxygen through tubular wire 78, and the weld joint 120B may be formed utilizing a relatively low flow rate of oxygen through the tubular wire 78. In this way, the weld joint 120A may be fabricated to have high tensile strength, and somewhat reduced fracture toughness, whereas the weld joint 120B may have lower yield strength, and higher fracture toughness.

Numerous other types of components may be fabricated according to the present invention. For example, with further reference to FIG. 5, a landing gear component 122 may comprise a stainless steel material that is fabricated utilizing an EBF$^3$ process (FIG. 1). In stainless steel alloys, increased concentrations of nitrogen provides increased yield strength. Thus, the object 122 may be fabricated utilizing tubular stainless steel wire 18 in an EBF$^3$ process, and the amount of nitrogen gas introduced into the molten pool 24 can be increased at the time one or more high stress areas 126 are fabricated. The amount of nitrogen flowing through the tubular stainless steel wire 18 may be varied as required to control the yield strengths and/or material properties at the time the landing gear component 122 is fabricated utilizing an EBF$^3$ process.

Figure 5:
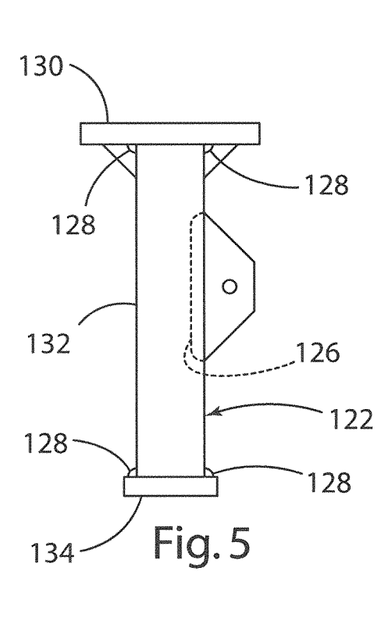
FIG. 5 is an aircraft structural component that may be fabricated according to another aspect of the present invention.

The component 122 may, alternatively, be fabricated from a plurality of individual stainless steel parts 130, 132, and 134 that are welded together at weld joints 128. The weld joints 128 may be formed utilizing the welding apparatus 50 of FIG. 2. The hollow wire 78 may comprise, for example, a stainless steel wire, and the gas supplied to the tubular wire 78 may comprise nitrogen gas from tank 58. The amount of nitrogen gas introduced at the time the welds 128 are formed may be varied as required to provide the desired strength, toughness, and corrosion resistance properties as required.

Figure 6:
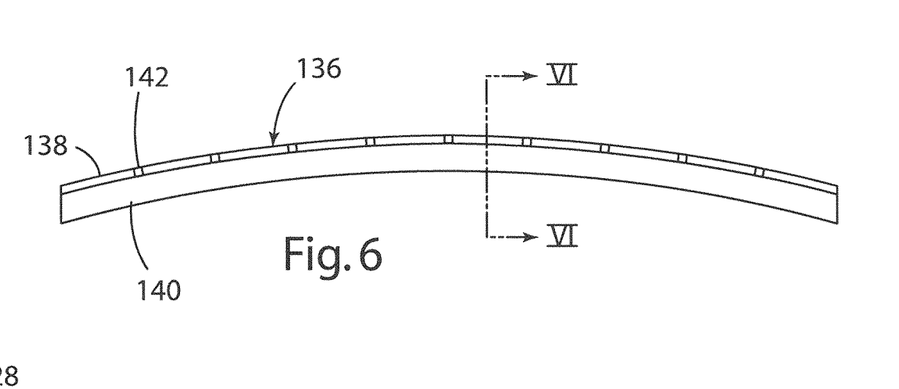
FIG. 6 is a cross sectional view of the component of FIG. 5 taken along the line VI-VI.
Figure 7:
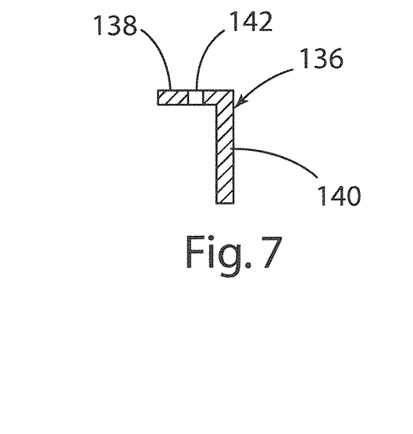
FIG. 7 is a drawing showing a titanium alloy having elongated columnar grains according to another aspect of the present invention.

Other structural components such as the aircraft wing structure 136 may also be fabricated according to other aspects of the present invention. In FIGS. 6 and 7, the aircraft wing structure 136 comprises an elongated titanium member having flange portions 138 and 140 that are generally L-shaped in cross section. The wing structure 136 may be fabricated utilizing tubular titanium wire 18 (see FIG. 1) in an EBF$^3$ process, and the amount of nitrogen supplied through the tubular wire 18 may be varied to control the material properties of the aircraft wing structure 136. For example, the flange 138 may include a plurality of openings 142 forming high stress regions around each opening 142. However, the flange 140 may comprise a lower stress region requiring higher fracture toughness. The nitrogen flow rate through the tubular wire 18 and/or the feed rate of tubular wire 18 may be varied as required to provide the specific material properties in the various regions of the structural wing component 136.

Figure 8:
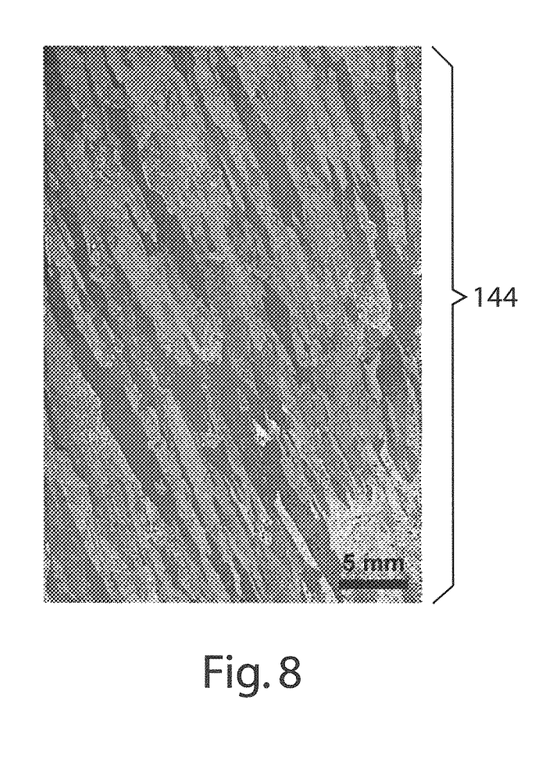
FIG. 8 is an image of a titanium material according to another aspect of the present invention.

With further reference to FIG. 8, a titanium material 144 having improved grain uniformity may be formed according to another aspect of the present invention. The titanium material 144 may be formed utilizing an EBF$^3$ process (see FIG. 1). During the EBF$^3$ process, hydrogen gas is introduced into the molten pool 24 (see FIG. 1) through the titanium tubular wire 18. This causes titanium hydrides to develop which favors the development of an equiaxed microstructure by pinning grain boundaries and providing for heterogeneous nucleation sites for new grains. Pinning the grains keeps them from growing, resulting in a more uniform, isotropic grain structure. Upon completion of an object made from the titanium material 144, the hydrogen is completely removed from the titanium material 144 by vacuum annealing as hydrogen is extremely mobile in titanium. In this way, the hydrogen may be utilized to influence the final grain structure, but the hydrogen can be removed after fabrication through a known heat treatment process. The titanium material 144 has non-isotropic properties due to the elongated columnar grains (see FIG. 8). It will be understood that the size and shape of the elongated columnar grains may be somewhat variable and/or non-uniform, and the elongated columnar grains as shown in FIG. 8 generally illustrate this concept, but do not necessarily represent the all possible grain structures produced according to this aspect of the present invention.

As discussed above, various materials and process gasses may be utilized for variations. Examples of metals that may be utilized include titanium, aluminum, iron-based steel, nickel-based superalloys, and magnesium alloys. Examples of process gasses include oxygen, nitrogen, carbon-based, hydrocarbon(s), and hydrogen, which may be in the form of $O_2$, $CO_2$, and $C_2H_2$. Organometallic gasses may also be used. These gasses not only introduce nonmetallic species (e.g. oxygen or nitrogen), but also a metallic component as well. This type of gas may be used to form organometallic compounds such as, for example, tetracarbonylnickel. Properties that can be controlled include strength, stiffness, hardness, corrosion resistance, microstructural grain size, fatigue strength, and fracture toughness.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of fabricating an object, the method comprising:
providing data representing an object to be fabricated;
performing stress analysis on the object to be fabricated, using the data, to determine a predicted operational stress distribution of the object to be fabricated;
determining at least one material property selected from the group consisting of yield strength, stiffness, hardness, corrosion resistance, microstructural grain size, fatigue strength, and fracture toughness to be controlled according to a predefined non-uniform distribution during fabrication of the object;
adding and solidifying molten pools of metal in a vacuum to progressively form the object in layers, including:
forming a molten pool of metal by melting a tubular wire of metal;
solidifying the molten pool of metal to form a metal deposit;
forming an additional molten pool of metal on at least a portion of the metal deposit by melting the tubular wire of metal;
solidifying the additional molten pool of metal to form an additional metal deposit; and
controlling a composition of at least a portion of at least one of the molten pool of metal, the additional molten pool of metal, and a grain structure of at least a portion of the metal deposits or the additional metal deposit during forming of the molten pool or the additional molten pool, independently of a feed rate of the tubular wire, including introducing a non-uniform volume of at least one process gas through the tubular wire and directly into the molten pool of metal or the additional molten pool of metal, thereby providing the predefined non-uniform distribution of the material property in the object, and
wherein the predefined non-uniform distribution comprises gradients of the material property that correspond to stress level gradients of the predicted stress distribution of the object and both the introduction of the non-uniform volume of the at least one process gas and the feed rate of the feed metal are varied to control a sharpness of transitions of the gradients of the material property.

2. The method of claim 1, including:
causing the at least one process gas to flow through the tubular wire and directly into the molten pool or the additional molten pool, such that the at least one process gas reacts with the molten metal; and
controlling an amount of the at least one process gas that interacts with the molten pool of metal or the additional molten pool of metal to thereby control the at least one material property.

3. The method of claim 1, including:
removing at least a portion of the at least one process gas from the object.

4. A method of fabricating an object, the method comprising:
providing data representing an object to be fabricated, the data including a predicted operational stress distribution of the object to be fabricated;
determining, via the data, strength or hardness gradients of the object to be fabricated, the strength or hardness gradients having a predefined non-uniform distribution;
forming a molten pool of metal by melting a tubular wire of metal in a vacuum using a laser beam or an electron beam, including introducing a process gas directly into the molten pool of metal through the tubular wire, independently of a feed rate of the tubular wire, to provide increased strength or hardness in one or more regions of the object having an increased predicted operational stress distribution;
solidifying the molten pool of metal to form a metal deposit having a first strength or hardness gradient;
forming an additional molten pool of metal on at least a portion of the metal deposit;
solidifying the additional molten pool of metal to form an additional metal deposit;
adding and solidifying molten pools of metal to form metal deposits utilizing the data to form the object represented by the data, the molten pools formed from the tubular wire delivered at the feed rate;
wherein a composition of at least a portion of at least one of the molten pools of metal and a grain structure of at least a portion of the metal deposits is controlled, by controlling introduction of a non-uniform volume of the process gas through the tubular wire and directly into the molten pool of metal, independently of the feed rate of the tubular wire, to provide the predefined non-uniform distribution of the material property in the object, the predefined non-uniform distribution having strength or hardness gradients that correspond to stress level gradients of the predicted operational stress distribution of the object.

5. The method of claim 1, including:
flowing the at least one process gas through the tubular wire at a defined flow rate; and
varying the flow rate to control the composition of the molten metal.

6. The method of claim 1, wherein:
the molten pools are formed utilizing an electron beam.

7. The method of claim 1, wherein:
the at least one process gas forms a porous region in the metal deposit or additional metal deposit.

8. The method of claim 7, including:
controlling a flow rate of the at least one process gas through the hollow wire to form regions of solidified metal having a predefined non-uniform density distribution.

9. The method of claim 1, wherein:
the molten pool of metal comprises stainless steel;
the at least one process gas comprises nitrogen; and
a flow rate of the nitrogen through the tubular wire is varied to provide increased material strength in selected regions of the object.

10. The method of claim 1, wherein forming a molten pool of metal by melting a tubular wire of metal includes:
causing electricity to flow through the tubular wire to thereby melt the tubular wire to form the molten pool of metal and the additional molten pool of metal.

11. The method of claim 10, wherein forming a molten pool of metal by melting a tubular wire of metal further includes:
providing a metal workpiece;
connecting the metal workpiece to a first source of electricity;
connecting the tubular wire to a second source of electricity; and
wherein causing electricity to flow through the tubular wire comprises causing electricity to flow from a first one of the metal workpiece and the tubular wire to the other of the metal workpiece and the tubular wire to thereby cause the tubular wire to melt and form the molten pool of metal and the additional molten pool of metal.

12. The method of claim 1, wherein the introduction of the non-uniform volume of the at least one process gas into the molten pool of metal and the additional molten pool of metal comprises:
introducing a first volume of a first process gas into a first molten pool of metal to provide increased material strength; and
introducing a second volume of a second process gas into a second molten pool of metal to provide increased hardness.

13. A method of progressively fabricating an object having a non-uniform material strength or hardness distribution via an electron beam freeform fabrication (EBF$^3$) process, the method comprising:
determining a predicted operational stress distribution of the object to be fabricated, the predicted operational stress distribution having a region of relatively high predicted operational stress and a region of relatively low predicted operational stress;
forming a first molten pool of metal by melting a tubular wire of metal in a vacuum using an electron beam;
controlling a flow of oxygen or nitrogen directly into the first molten pool of metal through the tubular wire, independently of a feed rate of the tubular wire, at a first rate at a first concentration corresponding to the predicted operational stress distribution in the region of relatively high predicted operational stress;
solidifying the first molten pool of metal to form a first metal deposit having a first strength or hardness;
forming a subsequent molten pool of metal on at least a portion of the first metal deposit by melting the tubular wire of metal in the vacuum using the electron beam;
controlling flow of the oxygen or nitrogen directly into the subsequent molten pool through the tubular wire, independently of the feed rate of the tubular wire, at a second rate and concentration corresponding to the predicted operational stress distribution in the region of relatively low predicted operational stress, thereby providing the predicted operational stress distribution by controlling introduction of non-uniform volumes of the oxygen or nitrogen through the tubular wire and directly into the first and subsequent molten pools of metal, independently of the feed rate of the tubular wire; and
solidifying the subsequent molten pool of metal to form a subsequent metal deposit having a second strength or hardness that is less than the first strength or hardness, such that the object has the non-uniform material strength or hardness distribution.

14. The method of claim 13, wherein the metal is titanium, further comprising supplying oxygen to the first molten pool of metal at a feed rate sufficient for increasing the strength of the first metal deposit relative to the strength of the subsequent metal deposit.

15. The method of claim 13, wherein the metal is titanium, further comprising supplying nitrogen gas to the first molten pool at a feed rate sufficient for increasing the hardness of the first metal deposit relative to the hardness of the subsequent metal deposit.

16. The method of claim 13, wherein both the introduction of the non-uniform volumes of the oxygen or nitrogen and the feed rate of the tubular wire are varied to control a sharpness of transitions of strength or hardness gradients of the material property.

17. The method of claim 4, wherein both the introduction of the non-uniform volume of the process gas and the feed rate of the tubular wire are varied to control a sharpness of transitions of the strength or hardness gradients of the material property.

18. The method of claim 4, wherein the step of providing data representing an object to be fabricated, the data including a predicted operational stress distribution of the object to be fabricated, further includes performing stress analysis on the object to be fabricated to determine the data representing the object to be fabricated.

* * * * *